(12) United States Patent
Ogawa

(10) Patent No.: US 7,527,317 B2
(45) Date of Patent: May 5, 2009

(54) SUNVISOR FOR VEHICLE

(75) Inventor: Hiroto Ogawa, Aichi-gun (JP)

(73) Assignees: Kyowa Sangyo Co., Ltd., Aichi-Ken (JP); Shinwa Seiko Co., Ltd., Aichi-Ken (JP)

( * ) Notice: Subject to any disclaimer, the term of this patent is extended or adjusted under 35 U.S.C. 154(b) by 66 days.

(21) Appl. No.: 10/556,926

(22) PCT Filed: Apr. 26, 2004

(86) PCT No.: PCT/JP2004/006017

§ 371 (c)(1),
(2), (4) Date: Feb. 6, 2007

(87) PCT Pub. No.: WO2004/101303

PCT Pub. Date: Nov. 25, 2004

(65) Prior Publication Data

US 2008/0023981 A1    Jan. 31, 2008

(30) Foreign Application Priority Data

May 14, 2003    (JP)    ............... 2003-136040

(51) Int. Cl.
*B60J 3/00* (2006.01)
(52) U.S. Cl. .................................. 296/97.5
(58) Field of Classification Search ............. 296/97.5, 296/97.1
See application file for complete search history.

(56) References Cited

U.S. PATENT DOCUMENTS 5,296,678 A * 3/1994 Schnorf ............... 219/203
5,919,422 A * 7/1999 Yamanaka et al. ........ 422/121
6,592,447 B1 * 7/2003 Yackman ................ 454/162
6,764,656 B1 * 7/2004 Matulevich .............. 422/124
6,843,965 B2 * 1/2005 Matulevich .............. 422/124

FOREIGN PATENT DOCUMENTS

| JP | 09086165 A | * | 3/1997 |
| JP | 09239019 A | * | 9/1997 |
| JP | 2003182431 A | * | 7/2003 |
| JP | 2005112276 A | * | 4/2005 |
| JP | 2007331731 A | * | 12/2007 |

OTHER PUBLICATIONS

English Summary of Abstract for JP No. 2-12917 filed Jan. 26, 1990.
English Summery Abstract for JP No. 54-9790 filed May 9, 1979.
English Summery of Abstract for JP No. 62-131920 filed Aug. 20, 1987.
International Search Report for PCT/JP2004/006017 dated Jul. 13, 2004 (2 pages).

* cited by examiner

*Primary Examiner*—H Gutman
(74) *Attorney, Agent, or Firm*—Conley Rose, P.C.

(57) ABSTRACT

It is accordingly an object of the present invention to provide a sunvisor for a vehicle equipped with a photocatalyst with a deodorizing effect. In the present invention, a vehicle sunvisor has a visor body that is mounted to a cabin-ceiling surface via a support shaft. The visor body rotates around the support shaft and switches between a storage position, where it is positioned along the cabin-ceiling surface, and a light shielding position, where it is positioned along a glass surface. In addition, a deodorizing part equipped with a photocatalyst having a deodorizing effect may be provided in the visor body.

15 Claims, 4 Drawing Sheets

SUNVISOR FOR VEHICLE

TECHNICAL FIELD

The present invention relates to a sunvisor for a vehicle whose visor body is mounted to a cabin-ceiling surface or a glass surface so as to be capable of being switched between a position where it is located along the cabin-ceiling surface and a light shielding position where it is located along the glass surface.

BACKGROUND ART

A sunvisor for a vehicle generally has a plate-shaped visor body, which is mounted to a cabin-ceiling surface via a support shaft. The visor body is rotated about the support shaft to be thereby switched between a storage position, where it is located along the cabin-ceiling surface, and a light shielding position where it is located along a windshield.

A sunvisor for a vehicle is mounted in a vehicle cabin and is used as one of the vehicle interior parts. Conventionally, there are vehicle interior parts of various constructions. Examples of their constructions are disclosed in Patent Document 1 (JP 2000-73276 A) and Patent Document 2 (JP 9-95133 A).

The vehicle interior parts disclosed in Patent Documents 1 and 2 are both sunshades to be mounted to the vehicle cabin interior side of a rear window.

The sunshade according to Patent Document 1 is equipped with support rods mounted along the left-hand side, the upper side, and the right-hand side of a rear window. A net-like fiber cloth is stretched between the support rods. Further, titanium oxide powder, which is a type of photocatalyst, and activated carbon powder, which is a type of adsorbent adapted to adsorb odors, are carried by the fiber cloth. Thus, the activated carbon powder adsorbs odors and the photocatalyst decomposes the odors.

The sunshade according to Patent Document 2 is a curtain to be mounted to the vehicle cabin interior side of a rear window. Photocatalysts are carried by both surfaces of the curtain. The photocatalysts decompose odors.

Thus, there have conventionally been known constructions in which a photocatalyst is provided on a sunshade mounted to the cabin interior side of a rear window. However, no construction has been known in which a photocatalyst is provided on a sunvisor for a vehicle. Neither has there been known any constructions in which a sunvisor for a vehicle has a deodorizing effect.

It is accordingly an object of the present invention to provide a sunvisor for a vehicle equipped with a photocatalyst having a deodorizing effect.

DISCLOSURE OF THE INVENTION

According to a first aspect of the present invention, a visor body is equipped with a deodorizing portion provided with a photocatalyst having a deodorizing effect.

That is, when light impinges upon the photocatalyst, the deodorizing portion decomposes odors. The deodorizing part is provided on the visor body. The visor body is switched to a light shielding position where it is positioned along a glass surface so as to shield light entering the cabin.

Thus, the deodorizing part can efficiently receive light through an adjustment of the position of the visor body. In addition, the deodorizing portion can efficiently decompose the odors.

According to a second aspect of the present invention, in addition to the photocatalyst, the deodorizing part is also equipped with an adsorbing material.

As a result, the deodorizing part adsorbs odors via the adsorbing material, and decomposes odors via the photocatalyst. Thus, the deodorizing part is capable of strongly eliminating odors by means of the adsorbing material and the photocatalyst.

When the visor body is set in the storage position, the deodorizing part is positioned along the cabin-ceiling surface (see the first aspect of the present invention). Therefore, the deodorizing portion efficiently adsorbs the odor of tobacco smoke or the like, which is lighter than air. Further, when the visor body is placed in a light shielding position, the deodorizing part is positioned along the glass surface. Consequently, the deodorizing part receives a large quantity of light and efficiently decomposes odors.

As a result, by placing the visor body in a light shielding position, light is shielded and it is possible to efficiently decompose odors by the photocatalysts of the deodorizing part. Further, by placing the visor body in a storage position, the visor body is stored, and it is possible to efficiently adsorb odors by the adsorbing material of the deodorizing part.

In this way, the deodorizing part efficiently adsorbs and decomposes odors.

According to a third aspect of the present invention, the visor body has a plurality of body constituting members stacked together in a thickness direction. A sheet-shaped deodorizing part is mounted between the body constituting members. Further, at least one of the plurality of body constituting members is provided with a light transmitting portion formed of a light transmitting material allowing the transmission of light to the deodorizing part, and a ventilation hole allowing air to flow through the deodorizing part.

That is, the deodorizing part is mounted between the body constituting members. Further, the deodorizing part receives light through the light transmitting portions provided in the body constituting members, and receives airflow through the ventilation holes formed in the body constituting members.

Therefore, air flows around the deodorizing part and as a result, the adsorbing material of the deodorizing part adsorbs the odors contained within the air. Further, light transmitted through the light transmitting portions impinges upon the deodorizing part and as a result, the photocatalyst of the deodorizing part decomposes odors. In this way, the deodorizing part adsorbs and decomposes odors.

The body constituting members forms the outer shell of the visor body and a sheet-shaped deodorizing part is mounted between the body constituting members. Therefore, the deodorizing part can be formed with a simple construction. For example, the deodorizing part can be of a construction with relatively low rigidity. As a result, it is possible to form the deodorizing part at a low cost.

According to a fourth aspect of the present invention, the visor body has a frame-shaped frame member. A sheet-shaped deodorizing part is mounted to the frame member so as to cover an opening at the center of the frame member (the opening may be bounded by the frame member). In addition, the deodorizing part is furnished with a light shielding property.

That is, the visor body has a frame member. The sheet-shaped deodorizing part covers the opening of the frame member. Further, the deodorizing part provides a light shielding property of the visor body.

In this way, the light shielding property of the visor body is partially provided by the deodorizing part so that the visor body can be formed with a relatively simple construction.

According to a fifth aspect of the present invention, the deodorizing part has a plurality of through-holes. The through holes endow the visor body with forward visibility through the through-holes. In addition, the ventilation property around the deodorizing part is improved by the through-holes.

Thus, the visor body allows forward visibility through the through-holes. Thus, a signal or the like can be easily checked via the through-holes. Thereby, usability of the visor body is improved.

Further, the ventilation around the deodorizing part is improved by the through-holes. Thus, air flows smoothly around the deodorizing part, making it easier for the adsorbing material of the deodorizing part to adsorb odors and for the photocatalysts of the deodorizing part to decompose odors.

In this way, the visor body is improved in terms of usability by the through-holes of the deodorizing part, thereby improving the deodorizing action of the deodorizing part.

According to a sixth aspect of the present invention, the visor body is provided with a support portion supporting the deodorizing part. Between the support portion and the deodorizing part, a corrosion-preventing portion, which may be formed of an inorganic material, is provided in order to prevent the support portion from being corroded by the photocatalysts of the deodorizing part.

That is, the visor body has a support portion that supports the deodorizing part through the intermediation of the corrosion-preventing portion.

Incidentally, the photocatalyst included in the deodorizing part is brought into a photo-excited state by applying light thereto, and functions to promote the corrosion of a resin or the like. Thus, when the support portion directly supports the deodorizing part, there is a risk of the support portion being corroded by the photocatalyst.

In contrast, the present invention provides a corrosion-preventing portion between the support portion and the deodorizing part. Thus, the support portion supports the deodorizing part through the intermediation of the corrosion-preventing portion so the support portion is not easily corroded by the photocatalyst. As a result, the support portion can support the deodorizing part for a long period of time in a stable manner.

BEST MODE FOR CARRYING OUT THE INVENTION

Embodiment 1

Embodiment 1 will be described with reference to FIGS. 1 and 2.

Figure 1:
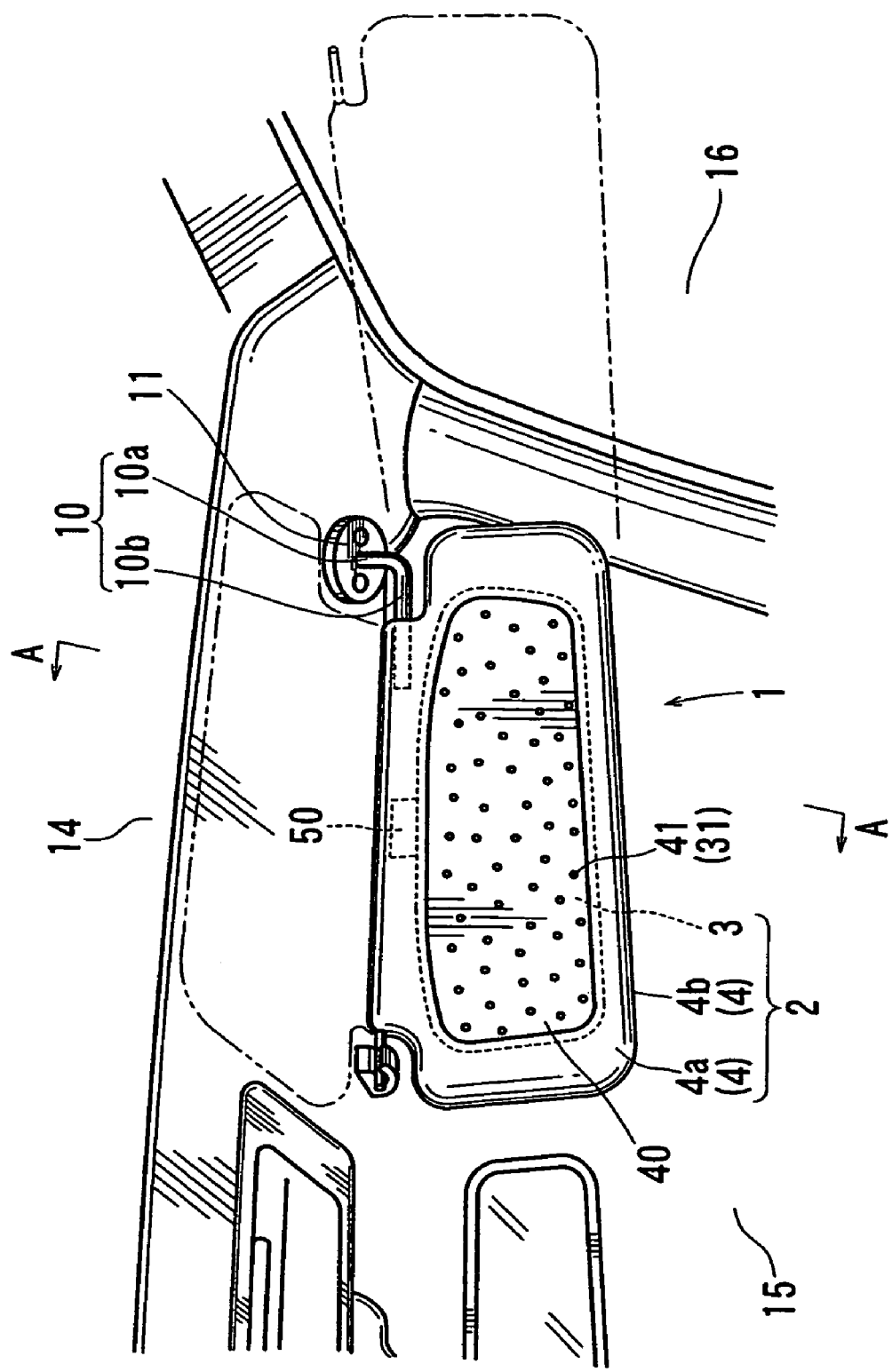
FIG. 1 is a perspective view of a sunvisor for a vehicle according to Embodiment 1 as mounted to a cabin-ceiling surface.

As shown in FIG. 1, a vehicle sunvisor 1 according to Embodiment 1 has a substantially plate-shaped visor body 2 and a support shaft 10 rotatably supporting the visor body 2.

The support shaft 10 is formed in a substantially L-shaped configuration, and has a vertical shaft portion 10a and a horizontal shaft portion 10b. Further, the visor body 2 is attached so as to be rotatable around the axis of the horizontal shaft portion 10b. The vertical shaft portion 10a is rotatably mounted to a cabin-ceiling surface 14 via a bracket 11.

Thus, by being rotated and horizontal shaft portion 10b, the visor body 2 is switched between a storage position, where it is positioned along the cabin-ceiling surface 14, and a light shielding position where it is positioned along the glass surface of a windshield 15. By being rotated around the vertical shaft portion 10a together with the support shaft 10, the visor body 2 is switched between the light shielding position, where it is positioned along the glass surface of the windshield 15, and a side position (i.e., side light shielding position) where it is positioned along the glass surface of a side glass 16 (i.e., a position between a passenger and glass surface).

Figure 2:
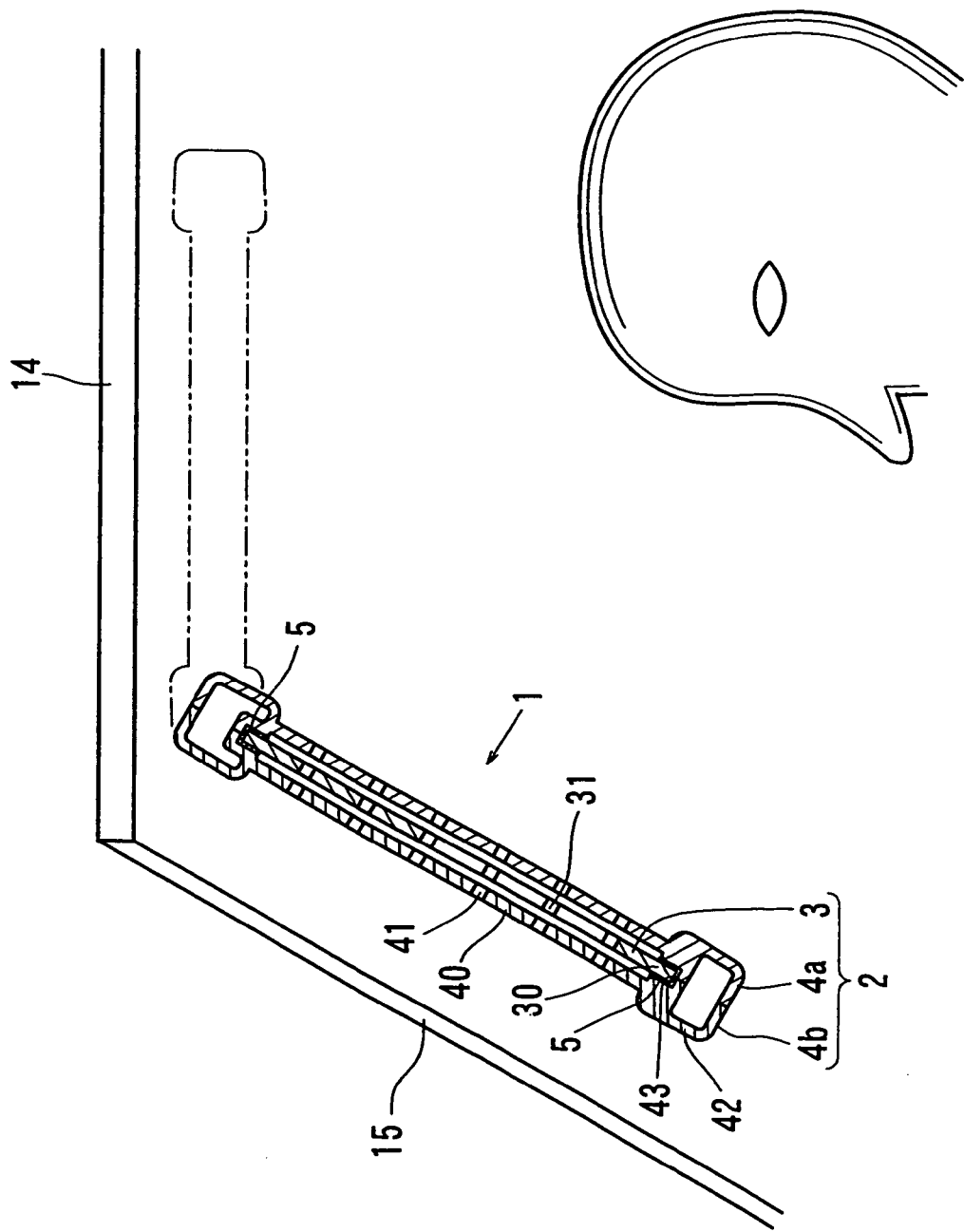
FIG. 2 is a sectional view taken along the arrow line A-A of FIG. 1.

As shown in FIG. 2, the visor body 2 has a plurality of (e.g., two) body constituting members, 4a and 4b, stacked together in a thickness direction. Further, a sheet-shaped deodorizing part 3 is mounted between the body constituting members, 4a and 4b.

In addition, there is no skin mounted so as to cover the outer surface of the body constituting members, 4a and 4b. Thus, the visor body 2 is of a skin-less type of construction.

The body constituting members, 4a and 4b, have an integral frame-shaped frame portion 42 and light transmitting portions 40 covering the inside of the frame portion 42.

Both the frame portion 42 and the light transmitting portions 40 are formed of a light-transmitting material, specifically, a material able to transmit ultraviolet rays, and are formed by molding, for example, of a transparent resin material or a semi-transparent resin material.

The frame portion 42 is formed in an annular configuration along the outer peripheral edge of the visor body 2. Further, as shown in FIG. 2, the frame portion 42 is formed as a hollow tube. Still further, a support portion 43 is formed in the in-frame edge of the frame portion 42 to support the deodorizing part 3.

The support portion 43 is formed as a groove in the frame portion 42. An outer peripheral edge 30 of the deodorizing part 3 is fitted into the groove. The support portion 43 then supports the deodorizing part 3. Further, the support portion 43 is provided substantially over the entire periphery of the inner frame edge of the frame portion 42. As a result, the support portion 43 supports substantially the entire periphery of the outer peripheral edge 30 of the deodorizing part 3.

As shown in FIG. 2, a corrosion-preventing portion 5 is provided between the support portion 43 and the deodorizing part 3.

The corrosion-preventing portion 5 is formed of an inorganic material, such as metal, and more preferably, a non-metallic inorganic material (e.g., ceramics, etc.). The corrosion-preventing portion 5 is formed as a separate member from the support portion 43. The corrosion-preventing portion 5 is provided in the support portion 43 by being fitted into the support portion 43. Alternatively, the corrosion-preventing portion 5 is provided in the support portion 43 by adhering to the surface of the support portion 43 in a plating method, such as sputtering.

As shown in FIG. 2, the light transmitting portions 40 cover the inside of the frame portion 42 (i.e., the area bounded by the frame portion 42). The light transmitting portions 40 cover the front surface and the back surface of the deodorizing part 3. Therefore, the two light transmitting portions 40 are stacked together with the deodorizing part 3. Further, a chamber is formed between the two light transmitting portions 40 for accommodating the deodorizing part 3.

Buffer spaces are formed between the light transmitting portions 40 and the deodorizing part 3. Consequently, both the front and back surfaces of the deodorizing part 3 can be exposed to air.

The light transmitting portions 40 have a plurality of ventilation holes 41 extending through them in the direction of thickness. As a result, the air flows into the space between the two light transmitting portions 40 via a plurality of ventilation holes 41, and consequently, air flows into the deodorizing part 3.

As shown in FIG. 2, the deodorizing part 3 is formed as a sheet. Further, the deodorizing part 3 has a base material consisting of a fiber sheet. The base material carries photocatalyst powder and adsorbing material powder.

The base material is formed, for example, of glass fibers, carbon fibers, or metal fibers, in the form of a net. Preferably the base material is coated with a fluorine resin. The photocatalyst powder and the adsorbing material powder are then carried via the fluorine resin.

A photocatalyst is a substance that is excited when it absorbs light, in particular, a substance that is likely to be excited by absorbing ultraviolet rays. When molecules, etc., constituting odors come into contact with the excited photocatalyst, the molecules are activated by the photocatalyst. This then promotes the chemical reaction of the molecules. In this way, the photocatalyst may exert a deodorizing action by chemically changing (i.e., decomposing) the molecules constituting the odors. Further, the photocatalyst may exert an antibacterial action, a sterilizing action, an anti-contamination action, and a toxic substance removing action (e.g., a volatile organic compound removing action), etc.

The photocatalyst is formed from titanium oxide, zinc oxide, and strontium titanate, etc., and is preferably doped with a dopant enhancing the activity of the photocatalyst. Vanadium, chromium, or the like, proves effective as the dopant.

The adsorbing material is a substance that easily adsorbs odors, for example, substances with activated carbon as the main component. Further, the adsorbing material may have a dark color (e.g., black), and shields light by absorbing the light striking its surface. Thus, the deodorizing part 3 is adapted to shield light.

In addition, as shown in FIG. 2, the deodorizing part 3 has a plurality of through-holes 31.

The through-holes 31 extend through the deodorizing part 3 in the thickness direction. The through-holes 31 are positioned so as to coincide, with respect to the thickness direction, with the ventilation holes 41 provided in the body constituting members 4a and 4b. Thus, it is relatively easy for air to pass through the visor body 2 via the ventilation holes 41 and the through-holes 31.

The diameters of the through-holes 31 are preferably made large enough for the passage of air. More preferably, the size of the through-holes 31 is determined such that the surface area of the deodorizing part 3 is increased to an optimum extent. The number of through-holes 31 is determined by the visibility requirement of the visor body 2.

Further, as shown in FIG. 1, the visor body 2 may have a fan 50.

The fan 50 is installed between the body constituting members 4a and 4b, and generates airflow by an electric motor or the like. Additionally, between the body constituting members 4a and 4b, a ventilation passage is formed for leading the air from the fan 50 to the deodorizing part 3. The air is blown on the deodorizing part 3 after having passed through the ventilation passage. Consequently, the fan 50 helps to improve the deodorizing action of the deodorizing part 3.

The vehicle sunvisor 1 is formed as described above.

The deodorizing part 3 decomposes odors when light impinges upon the photocatalyst. Furthermore, the deodorizing part 3 is provided on the visor body 2 and the visor body 2 is moved to the light shielding position in order to shield light entering the cabin.

Therefore, by adjusting the position (i.e., angle) of the visor body 2, the deodorizing part 3 can efficiently receive light and efficiently decompose odors.

The deodorizing part 3 may also be equipped with an adsorbing material for adsorbing odors.

The deodorizing part 3 consequently adsorbs odors with the adsorbing material and decomposes odors with the photocatalyst. Accordingly, the deodorizing part 3 can aggressively eliminate odors via the adsorbing material and the photocatalyst.

As shown in FIG. 1, when the visor body 2 is placed in a storage position, the deodorizing part 3 is positioned along the cabin-ceiling surface. Therefore, the deodorizing part 3 can efficiently adsorb the odor of tobacco smoke or the like, which is lighter than the surrounding air. Furthermore, when the visor body 2 is placed in a light shielding position the deodorizing part 3 is positioned along the glass surface of the windshield 15 or the side glass 16. As a result, the deodorizing part 3 receives a large quantity of light and is able to efficiently decompose odors.

In other words, by rotating the visor body 2 to the light shielding position, light is shielded and the photocatalyst of the deodorizing part 3 can efficiently decompose odors. By rotating the visor body 2 to the storage position, the visor body 2 is stored and the adsorbing material of the deodorizing part 3 can efficiently adsorb odors.

Consequently, the deodorizing part 3 efficiently adsorbs and decomposes odors.

As shown in FIG. 2, the deodorizing part 3 is mounted between the body constituting members 4a and 4b. Additionally, the deodorizing part 3 receives light through the light transmitting portions 40 provided on the body constituting members 4a and 4b, and receives an airflow through the ventilation holes 41 formed in the body constituting members 4a and 4b.

Thus, air flows around the deodorizing part 3, and the adsorbing material of the deodorizing part 3 adsorbs odors contained in the air. Light transmitted through the light transmitting portions 40 then impinges upon the deodorizing part 3. As a result, the photocatalyst of the deodorizing part 3 is able to decompose the odors. In this way, the deodorizing part 3 adsorbs and decomposes odors.

The body constituting members 4a and 4b form the outer shell of the visor body 2. Additionally, the sheet-shaped deodorizing part 3 is mounted between the body constituting members 4a and 4b. Thus, the deodorizing part 3 can be formed from a relatively simple construction. For example, it is possible to form the deodorizing part 3 using a construction with low rigidity. In this way, it is possible to form the deodorizing part 3 at a relatively low cost.

As shown in FIG. 2, the deodorizing part 3 has a plurality of through-holes 31. As such, the visor body 2 is endowed with forward visibility through the through-holes 31. In addition, the through-holes 31 improve the ventilation property around the deodorizing part 3.

Thus, the visor body 2 allows an operator to look ahead through the through-holes 31. Accordingly, a signal or the like can easily be checked through the through-holes 31, thereby improving the usability of the visor body 2.

The through-holes 31 also improve the ventilation property around the deodorizing part 3. Thus, the air around the deodorizing part 3 is able to flow smoothly. This makes it easy for the adsorbing material of the deodorizing part 3 to adsorb odors and for the photocatalyst of the deodorizing part 3 to decompose odors.

In this way, due to the through-holes 31 of the deodorizing part 3, the visor body 2 is improved in terms of usability. In addition, the deodorizing part 3 is improved in terms of deodorizing action.

As shown in FIG. 2, the visor body 2 has the support portion 43, which supports the deodorizing part 3 through the corrosion-preventing portion 5.

Incidentally, the photocatalyst that the deodorizing part 3 has is brought into a photo-excited state by applying light thereto, and also has the effect of promoting the corrosion of resin, etc. Thus, when the support portion 43 directly supports the deodorizing part 3, there is a risk of the photocatalyst corroding the support portion 43.

In this regard, this embodiment provides a corrosion-preventing portion 5 between the support portion 43 and the deodorizing part 3. The support portion 43 supports the deodorizing part 3 through the intermediation of the corrosion-preventing portion 5. Therefore, the support portion 43 is not easily corroded by the photocatalyst. As a result, the support portion 43 can stably support the deodorizing part 3 for a long period of time.

As further shown in FIG. 2, the ventilation holes 41 of the body constituting members 4a and 4b are provided at positions corresponding to the through-holes 31 of the deodorizing part 3. Therefore, it is possible for the air to flow smoothly around the deodorizing part 3, improving the deodorizing part 3 in regards to the deodorizing action.

Also as shown in FIG. 2, the vehicle sunvisor 1 is mounted to the cabin-ceiling surface 14, so the sunvisor 1 is mounted at a position relatively close to the passenger. As a result, it is possible for the deodorizing part 3 of the vehicle sunvisor 1 to efficiently remove odors and toxic substances around the immediate area around the passenger.

Embodiment 2

Embodiment 2 will be described with reference to FIGS. 3 and 4.

The vehicle sunvisor 1 of Embodiment 2 is formed substantially in the same manner as the sunvisor of Embodiment 1. However, as shown in FIG. 4, this embodiment differs from Embodiment 1 in that the visor body 2 has no light-transmitting portions (i.e., the light-transmitting portions 40 shown in FIG. 2). The vehicle sunvisor 1 of Embodiment 2 will be described in the following by focusing on the differences between this and the above embodiment.

Figure 3:
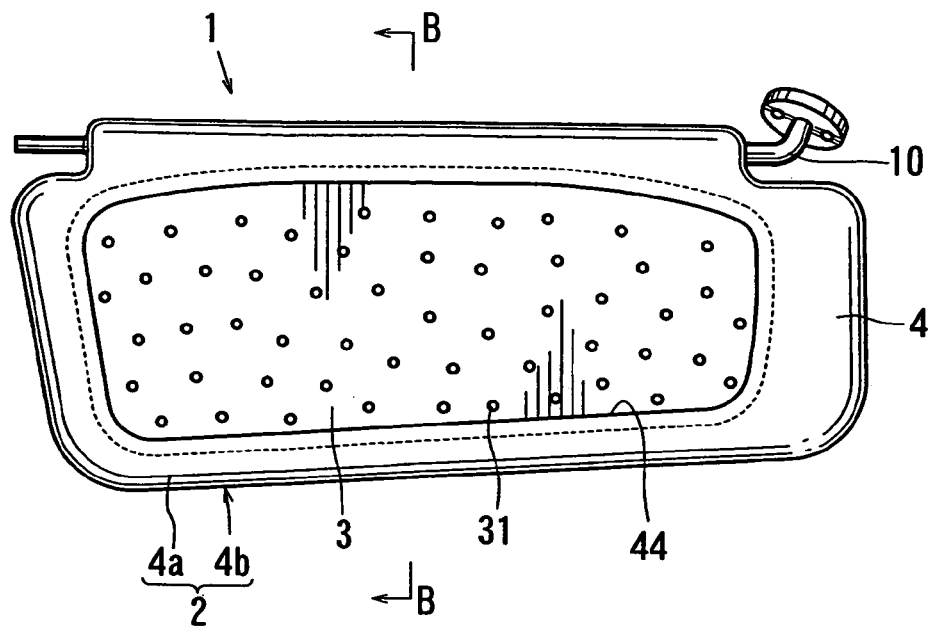
FIG. 3 is a front view of a sunvisor for a vehicle according to Embodiment 2.

As shown in FIG. 3, the vehicle sunvisor 1 of Embodiment 2 has a visor body 2 and a support shaft 10. The visor body 2 has a frame member 4 and a deodorizing part 3.

The frame member 4 is formed in the shape of a frame, so as to form the outer peripheral frame portion of the visor body 2. The frame member 4 has a plurality of (e.g., two in this example) body constituting members 4a and 4b stacked together in the direction of thickness.

Figure 4:
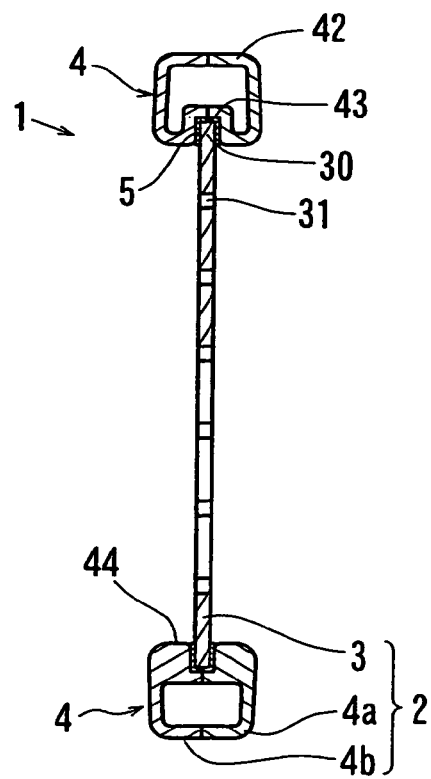
FIG. 4 is a sectional view taken along the arrow line B-B of FIG. 3.

As shown in FIG. 4, the body constituting members 4a and 4b are mutually mounted together in the thickness direction to form the frame member 4, which is configured as a hollow tube. Further, the frame member 4 has an opening 44 at the frame center and a support portion 43 to support the deodorizing part 3 at an inner peripheral frame edge along the opening 44.

As further shown in FIG. 4, the deodorizing part 3 is formed as a sheet, and, as shown in FIG. 3, the deodorizing part 3 is mounted to the frame member 4 so as to cover the opening 44 of the frame member 4. The deodorizing part 3 may have a dark color along with a light shielding property. In addition, the deodorizing part 3 may be provided with a plurality of through-holes 31.

The vehicle sunvisor 1 of Embodiment 2 is formed as described above.

That is, the visor body 2 has a frame member 4 and a sheet-shaped deodorizing part 3 covering the opening 44 of the frame member 4. The deodorizing part 3 also provides a light shielding property for the visor body 2.

Thus, the light shielding property of the visor body 2 is partially provided by the deodorizing part 3 so that the visor body 2 can be formed with a relatively simple construction.

Embodiment 3

Embodiment 3 will be described with reference to FIGS. 5 and 6.

The vehicle sunvisor 1 of Embodiment 3, which is formed in substantially the same manner as that of Embodiment 1, differs from the sunvisor of Embodiment 1 in the following points.

Figure 5:
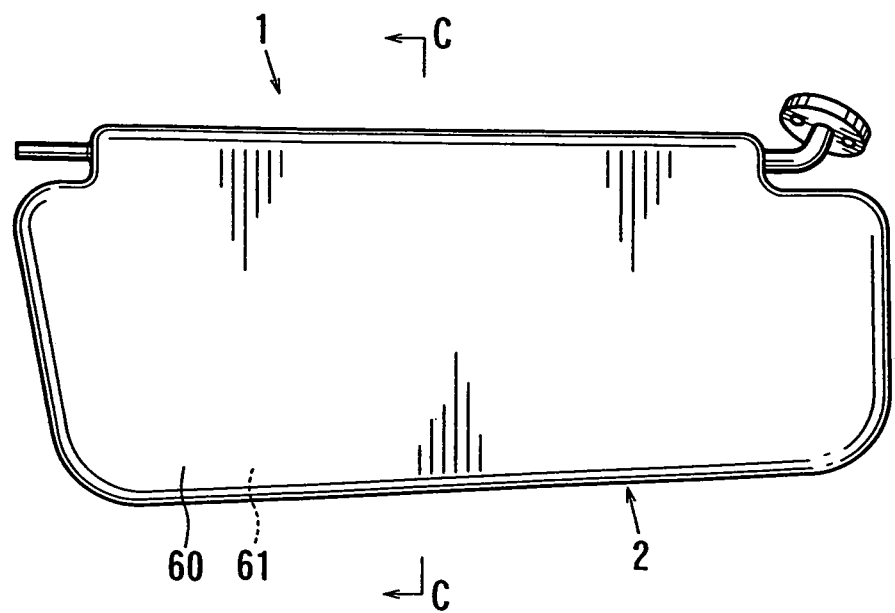
FIG. 5 is a front view of a sunvisor for a vehicle according to Embodiment 3.
Figure 6:
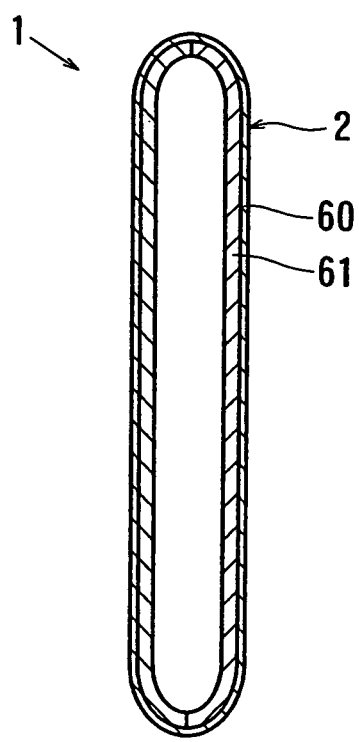
FIG. 6 is a sectional view taken along the arrow line C-C of FIG. 5.

That is, as shown in FIG. 5, the vehicle sunvisor 1 of Embodiment 3 has a visor body 2 and a support shaft 10. As shown in FIG. 6, the visor body 2 has a shell member 61 in the form of a hollow plate. A deodorizing part 60 is provided on the outer surface of the shell member 61.

The deodorizing part 60 may be provided on the outer surface of the shell member 61 (i.e., visor body 2) by being attached thereto. Alternatively, the deodorizing part 60 may be provided on the outer surface of the shell member 61 by a plating method, such as sputtering.

Other Embodiments

The present invention is not limited to the above embodiments, which are presented as examples of the teachings of the invention. In addition, the invention can be configured as the following embodiments among the others, such as, for example, combinations of various components of the embodiments.

(1) The deodorizing part and the body constituting members of Embodiments 1 and 2 are formed as separate component members. Further, the deodorizing part and the shell member of Embodiment 3 are also formed as separate component members. However, it is also possible for the deodorizing part to be provided with the body constituting members or with the shell member itself. For example, it is also possible to mix the adsorbing material and the photocatalyst with the material of the body constituting members or the shell member. The mixture material thus obtained can then be used to form the body constituting members or the shell member. Consequently providing the deodorizing part with the body constituting members or with the shell member itself.

(2) As shown in FIG. 2, the visor body 2 of Embodiment 1 has a plurality of body constituting members 4a and 4b. Each of the body constituting members 4a and 4b has a light transmitting portion 40 and ventilation holes 41. However, it is also possible to adopt a form in which one of the body constituting members 4a and 4b has no light transmitting portion 40 or is formed of a material that does not transmit light. Further, it is also possible to adopt a form in which the ventilation holes 41 are provided in one or both of the body constituting members 4a, and 4b.

(3) Each of the deodorizing parts of Embodiments 1 through 3 has a photocatalyst and an adsorbing material. However, it is also possible to adopt a form in which the deodorizing part has only a photocatalyst without the adsorbing material.

(4) Each of the visor bodies of Embodiments 1 through 3 is rotatable around the support shaft between a storage position, where the sunvisor is positioned along the cabin-ceiling surface, and a light shielding position, where the sunvisor is positioned along a glass surface. However, it is also possible for the visor body to be made slidable between the storage position and the light shielding position through a sliding structure.

(5) Each of the visor bodies of Embodiments 1 through 3 is rotatable around the support shaft between the storage position and the light shielding position. However, it is also possible to adopt a form in which the visor body can be switched between the storage position and the light shielding position through a hinge portion mounted to the visor body.

(6) Each of the visor bodies of Embodiments 1 through 3 is mounted to the cabin-ceiling surface via the support shaft. However, it is also possible to adopt a form in which the visor body is attached to the glass surface by means of an adhesive, an adhesive material, and a suction disc, etc.

The invention claimed is:

1. A sunvisor for a vehicle capable of being switched between a storage position along a cabin ceiling surface and a light shielding position between a passenger and a glass surface of the vehicle, comprising:
    a visor body that is mounted to a point inside of the vehicle;
    wherein a deodorizing part comprising a photocatalyst having a deodorizing effect is included in the visor body,
    wherein the visor body comprises a plurality of body constituting members stacked together in a thickness direction and a sheet-shaped deodorizing part mounted between the body constituting members,
    wherein at least one of the plurality of body constituting members comprises:
        a light transmitting portion formed of a light transmitting material permitting transmission of light to the deodorizing part, and
        a ventilation hole allowing air to flow through the deodorizing part.

2. The sunvisor according to claim 1,
    wherein the deodorizing part comprises a plurality of through-holes,
    wherein the visor body enables visibility through the through-holes.

3. A sunvisor for a vehicle capable of being switched between a storage position along a cabin ceiling surface and a light shielding position between a passenger and a glass surface of the vehicle, comprising:
    a visor body that is mounted to a point inside of the vehicle;
    wherein a deodorizing part comprising a photocatalyst having a deodorizing effect is included in the visor body,
    wherein the visor body comprises a frame-shaped frame member and a sheet-shaped deodorizing part which is mounted to the frame member so as to cover an opening at the center of the frame member,
    wherein the deodorizing part is configured to have a light shielding property.

4. The sunvisor according to claim 3,
    wherein the deodorizing part comprises a plurality of through-holes, wherein the visor body enables visibility through the through-holes.

5. A sunvisor for a vehicle capable of being switched between a storage position along a cabin ceiling surface and a light shielding position between a passenger and a glass surface of the vehicle, comprising:
    a visor body that is mounted to a point inside of the vehicle;
    wherein a deodorizing part comprising a photocatalyst having a deodorizing effect is included in the visor body,
    wherein the visor body comprises a support portion to support the deodorizing part, and
    wherein a corrosion preventing portion formed of an inorganic material is provided between the support portion and the deodorizing part.

6. A sunvisor for a vehicle capable of being switched between a storage position along a cabin ceiling surface and a light shielding position between a passenger and a glass surface of the vehicle, comprising:
    a visor body that is mounted to a point inside of the vehicle
    wherein the sunvisor comprises:
    a photocatalyst,
    an adsorbing material able to adsorb odors,
    a deodorizing part including the photocatalyst and the adsorbing material, wherein the deodorizing part is in the form of a sheet, and wherein the deodorizing part further comprises a plurality of voids or holes allowing at least partial visibility through the deodorizing part.

7. The sunvisor according to claim 6, wherein the visor body is formed from two components joined along at least the outer periphery thereof.

8. The sunvisor according to claim 7, further comprising:
    a corrosion prevention portion, wherein the visor body is formed in the form of a frame, and
    wherein the deodorizing part is joined to the visor body via the corrosion prevention portion.

9. The sunvisor according to claim 8, wherein at least one of the two components of the visor body further includes a light transmitting portion, and
    wherein at least one of the two components of the visor body further includes a plurality of voids or holes,
    so that, the passenger has at least partial visibility through the visor body.

10. The sunvisor according to claim 9, further comprising:
    a fan able to increase air circulation around the deodorizing part.

11. The sunvisor according to claim 9, wherein locations of the plurality of voids or holes in the deodorizing part correspond to locations of the plurality of voids or holes in at least one of the two components of the visor body.

12. A sunvisor for a vehicle capable of being switched between a storage position along a cabin ceiling surface and a light shielding position between a passenger and a glass surface of the vehicle, comprising:
    a visor body that is rotatably mounted to a shaft;
    wherein the shaft is rotatably mounted to a cabin-ceiling of the vehicle,
    wherein the visor body comprises;
    a first frame half joined at least around a periphery to a second frame half,
    wherein at least one of the frame halves further comprises:
        a light transmitting portion covering the area bounded by the frame half,
        a plurality of openings contained within the light transmitting portion,
    a sheet shaped deodorizing part comprising:
        a photocatalyst having a deodorizing effect,
        a plurality of openings aligned with the plurality of openings contained within the light transmitting portion of the at least one of the frame halves, a corrosion preventing portion, wherein the deodorizing part is joined to the visor body via the corrosion preventing portion.

13. The sunvisor according to claim 12, wherein the deodorizing part further comprises an odor adsorbing material.

14. The sunvisor according to claim 12, where the plurality of openings of the light transmitting portion and the plurality of openings of the deodorizing part are each sized so as to allow at least partial visibility through the visor body.

15. The sunvisor according to claim 12, further comprising a fan located within the visor body.

* * * * *